United States Patent [19]

Slaughter

[11] 4,401,361

[45] * Aug. 30, 1983

[54] OPTICAL GUIDES

[75] Inventor: Raymond J. Slaughter, Chislehurst, England

[73] Assignee: BICC Limited, London, England

[*] Notice: The portion of the term of this patent subsequent to Feb. 11, 1992 has been disclaimed.

[21] Appl. No.: 763,985

[22] Filed: Jan. 31, 1977

Related U.S. Application Data

[63] Continuation of Ser. No. 367,125, Jun. 5, 1973, abandoned.

[30] Foreign Application Priority Data

Jun. 6, 1972 [GB] United Kingdom ............... 26339/72
Nov. 10, 1972 [GB] United Kingdom ............... 52098/72
Dec. 8, 1972 [GB] United Kingdom ............... 56727/72

[51] Int. Cl.³ ............................................. G02B 5/16
[52] U.S. Cl. .................................................. 350/96.23
[58] Field of Search ........................... 350/96 B, 96.23; 174/20 R, 11 S, 117 R

[56] References Cited

U.S. PATENT DOCUMENTS

| | | | |
|---|---|---|---|
| 2,628,998 | 2/1953 | Frisbie | 174/117 F |
| 3,060,260 | 12/1962 | Scofield | 174/117 F |
| 3,544,192 | 12/1970 | Goldstein | 174/117 F |
| 3,763,306 | 10/1973 | Marshall | 174/115 |
| 3,847,483 | 11/1974 | Shaw et al. | 350/96 B |
| 3,887,265 | 6/1975 | Mangolis et al. | 350/96 B |

FOREIGN PATENT DOCUMENTS 1250823 10/1971 United Kingdom ............ 174/70 R

Primary Examiner—John D. Lee
Attorney, Agent, or Firm—Buell, Blenko, Ziesenheim & Beck

[57] ABSTRACT

An optical cable comprises at least one optical bundle and at least two separate elongate reinforcing members. The axes of the or each optical bundle and the reinforcing members lie substantially in a common plane with the or each optical bundle located between and spaced from two reinforcing members. Each reinforcing member has an overall dimension perpendicular to said common plane that is substantially greater than the corresponding overall dimension of the or each optical bundle so that the or each bundle lies in the space bounded by two planes one located on each side of the two members and touching both members. An extruded outer sheath surrounds and fills the interstices between the optical bundle or bundles and the reinforcing members.

10 Claims, 5 Drawing Figures

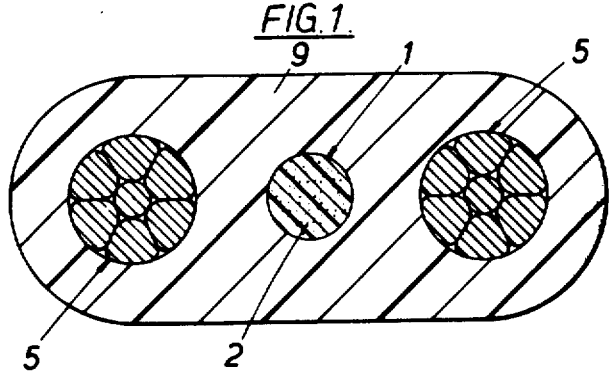
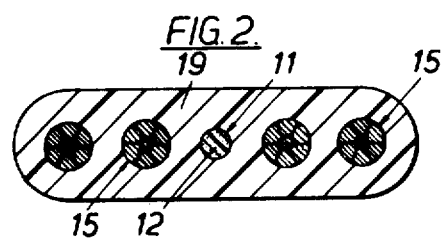

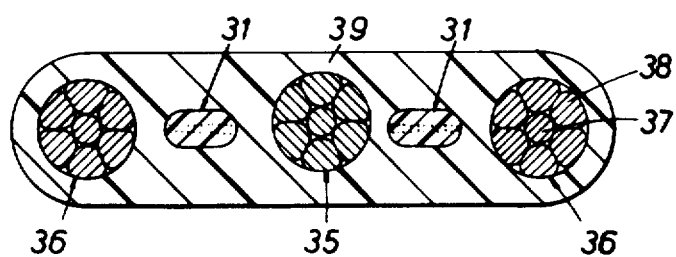
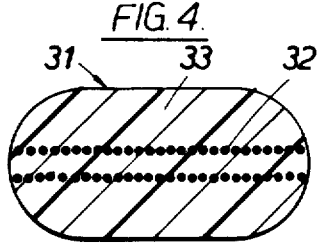
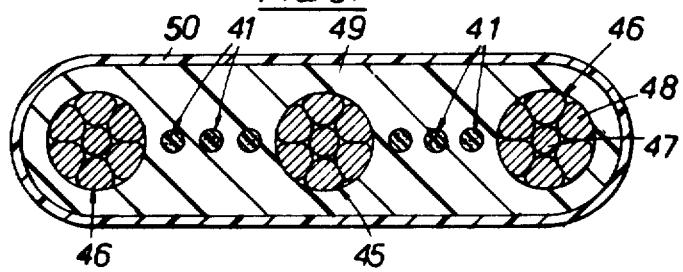

OPTICAL GUIDES

This application is a continuation of my copending application Ser. No. 367,125, filed June 5, 1973 (abandoned).

This invention relates to optical guides for the transmission of the ultra-violet, visible and infra-red regions of the electromagnetic spectrum, which regions, for convenience, will hereinafter all be included in the generic term "light", and especially, but not exclusively, to optical waveguides for use in the communications field adapted for transmission of light having a wavelength within the range 0.8 to 1.1 micrometers.

For the purpose of transmitting light in an optical transmission system it has been proposed to employ optical guides including one or more than one optical fibre. Where an optical guide comprises a plurality of optical fibres these are generally arranged in a bundle which is sometimes enclosed in an outer protective sheath.

The invention is especially, but not exclusively, concerned with optical guides including one or more than one optical fibre of composite form comprising a core of transparent material clad throughout its length with another transparent material of lower refractive index which by total internal reflection of light being transmitted along the fibre or fibres confines at least a major proportion of the light within the core. A composite optical fibre is generally, but not necessarily, made of two glasses of different refractive indices, the glass forming the core having a higher refractive index than the glass forming the cladding. In an alternative form of composite optical fibre the core may be made of a transparent liquid having a higher refractive index than that of the cladding.

According to the present invention we provide an optical cable comprising at least one optical bundle comprising at least one group of fibres of which at least some are optical fibres; at least two separate elongate reinforcing members arranged with their axes and the axis of at least one optical bundle lying substantially in a common plane and with the at least one optical bundle located between and spaced from two reinforcing members, each reinforcing member having an overall dimension perpendicular to said common plane that is substantially greater than the corresponding overall dimension of the at least one optical bundle so that the at least one optical bundle lies in the space bounded by two planes one located on each side of the two members and each touching both members; and an extruded outer sheath with surrounds and fills the interstices between the at least one bundle and the reinforcing members. It is to be understood that each optical fibre and/or non-optical fibre of an optical bundle may be of circular or non-circular cross-section. Each optical fibre of an optical bundle may be used independently as a separate light guide, each with its own modulated light source and detector, or a plurality of optical fibres of a bundle may be used together as a single light guide, with a single light source.

Preferably, each reinforcing member is of such a cross-sectional area with regard to the material or materials and cross-sectional area of the bundle or bundles that the strain otherwise imparted to the or each bundle when the cable is stressed in such a way as to tend to subject the or any optical fibre of the bundle to a tensile force is eliminated or at least substantially reduced by the reinforcing member or members.

Where the optical cable includes two or more optical bundles the bundles may be arranged side by side between two outer reinforcing members but preferably, to provide optimum protection against crushing, an elongate reinforcing member is arranged to lie between the or each adjacent pair of optical bundles.

Preferably the optical bundle or at least one of the optical bundles is of such a form that relative movement between fibres and/or groups of fibres is prevented or at least substantially reduced, thereby protecting surfaces of the fibres and/or groups of fibres from mechanical damage that might otherwise be caused by contact or rubbing between adjacent fibres. The optical bundle or at least one of the optical bundles may be of such a form that the position of each optical fibre, and/or of each group of optical fibres, of the bundle is maintained constant with respect to the positions of the other optical fibres and/or groups of optical fibres of the bundle in such a way that the said optical fibre or group of optical fibres can be readily identified at any transverse cross-section along the length of the optical cable.

The fibres and/or groups of fibres of the optical bundle, or of at least one and preferably each, of the optical bundles, throughout substantially the whole length of the bundle are preferably embedded in and mutually separated by encapsulating material, the encapsulating material being of such a nature that the position of each optical fibre, or of each group of optical fibres, with respect to the positions of the other optical fibres and/or groups of optical fibres of the bundle is maintained substantially constant. In one embodiment of the invention the optical fibres and/or groups of optical fibres of the or each bundle may be arranged in a predetermined configuration, for instance in one or more than one row, the or each row comprising a plurality of optical fibres and/or groups of optical fibres arranged side by side.

Where the optical cable includes two or more optical bundles, the encapsulating material of each bundle is preferably of a colour distinguishable from that of the encapsulating material of the other bundle or bundles.

The encapsulating material may comprise any encapsulating material that will maintain the embedded optical fibres and/or groups of optical fibres substantially fixed with respect to one another. Preferred encapsulating materials include synthetic resins, for instance polyester resin.

If desired each of some or all of the optical fibres of the or each optical bundle may have an outer coating of a colour distinguishable from that of the outer coatings of other optical fibres.

To provide additional mechanical protection for the or each optical bundle the bundle may be enclosed in an individual protective covering, for instance of rubber or plastics material, and the protective coverings of two or more bundles may be of different colours to facilitate identification.

Each elongate reinforcing member may be a single solid element but with a view to making the optical cable as flexible as possible each reinforcing member preferably comprises a plurality of elements stranded together. Each element is preferably of steel, carbon fibre or any other suitable material having the necessary Young's Modulus. Where each reinforcing member is of stranded form, for instance a strand of steel wires, the strand is preferably die-formed; that is to say a strand that has been passed through a die which effects a reduction in the overall diameter of the strand. Such a compacted strand has the advantage over non-compacted strands of a higher apparent Young's Modulus at low strain.

At least two of the reinforcing members may be made of or may be coated with a metal or metal alloy of high electrical conductivity to provide a circuit or circuits, for instance for feeding electrical power to repeaters or regenerators.

Where, as is preferred, each reinforcing member is of stranded form, at least one of the elements of the strand may be a metal or metal alloy of high electrical conductivity. For example, in a stranded reinforcing member consisting of six elements stranded around a central element, the central element may be of steel and the surrounding six elements of copper or, in an alternative construction, all of the elements of the strand may be of hard drawn copper or cadmium copper.

Each of some or all of the conductor elements of the reinforcing member may be individually insulated. For instance, each conductor element may comprise an enamelled copper wire or the conductor elements may be of anodized aluminium or aluminum-based alloy, coloured for identification purposes.

Preferably the sheath is made of a hard polyolefin such as polypropylene or a modified polypropylene, for example propylene ethylene copolymer. Other suitable materials for the sheath include polyethylene, espcially high density polyethylene. The sheath may have an oversheath of a material having a low friction co-efficient, such as nylon.

The invention will be further illustrated by a description, by way of example, of five forms of optical cable with reference to the accompanying drawings, in which:

FIG. 1 is a cross-sectional end view of a first form of optical cable drawn on an enlarged scale;

FIG. 2 is a similar view of a second form of optical cable drawn on an enlarged scale;

FIG. 3 is a cross-sectional end view of a third form of optical cable drawn on an enlarged scale;

FIG. 4 is a cross-sectional end view of an optical bundle, drawn on an enlarged scale, of the optical cable shown in FIG. 3, and FIG. 5 is a cross-sectional end view of a fourth form of optical cable drawn on an enlarged scale.

Referring to FIG. 1, the optical cable comprises an optical bundle 1, a pair of elongate reinforcing members 5 arranged on opposite sides of the bundle with their axes and that of the bundle lying in a substantially common plane and, surrounding and filling the interstices between the bundle and reinforcing members, an extruded outer protective sheath 9 of propylene ethylene copolymer. The optical bundle 1 comprises a plurality of composite optical fibres 2, each consisting of a liquid core of ethylene tetrachloride and a cladding of silica, the fibres of the bundle being encapsulated in acrylic resin. The bundle 1 has an overall diameter of 1.0 mm. Each reinforcing member 5 comprises a die-formed strand of seven steel wires, the strand having an overall diameter of 2 mm. The cable is 5 mm thick and has a width of 10 mm.

The optical cable shown in FIG. 2 comprises an optical bundle 11, four elongate reinforcing members 15 arranged two on each side of the bundle with their axes and that of the bundle lying in a substantially common plane and, surrounding and filling the interstices between the bundle and reinforcing members, an extruded outer protective sheath 19 of propylene ethylene copolymer. The optical bundle 11 comprises a plurality of optical fibres 12, each made from two low attenuation glasses, the bundle being enclosed in an external protective sheath 14 of polyvinyl chloride and having an overall diameter of 1.2 mm. Each reinforcing member 15 comprises a die-formed strand of seven steel wires, the strand having an overall diameter of 1.4 mm. The cable is 4 mm thick and has a width of 13 mm.

The optical cable shown in FIG. 3 comprises two optical bundles 31 positioned between three elongate reinforcing members 35 and 36 with the axes of the bundles and reinforcing members lying in a sunbstantially common plane and, surrounding and filling the interstices between the bundles and reinforcing members, an extruded outer protective sheath 39 of propylene ethylene copolymer. As will be seen on referring to FIG. 4, each optical bundle 31 comprises fifty composite fibres 32, each consisting of a core of low attenuation optical glass and a cladding of glass of lower refractive index than that of the core, arranged in two rows of twenty-five and encapsulated in a flexible polyester resin 33. Each bundle 31 has a width of 2 mm and a thickness of 1 mm. The outer reinforcing members 36 each comprise a stranded body consisting of a steel wire core 37 around which are stranded six copper wires 38 and the middle reinforcing member 35 comprises a stranded body of seven steel wires. The optical cable has a width of 16 mm and a thickness of 4 mm.

The optical cable shown in FIG. 5 comprises two clusters of optical bundles 41 positioned between three elongate reinforcing members 45 and 46 with the axes of the bundles and reinforcing members lying in a substantially common plane and, surrounding and filling the interstices between the bundles and reinforcing members, an extruded outer protective sheath 49 of propylene ethylene copolymer. The sheath 49 has an oversheath 50 of nylon. Each cluster of optical bundles 41 comprises three separate bundles arranged side by side and each comprising ten composite fibres encapsulated in a flexible acrylic resin to form a bundle of substantially circular cross-section having a diameter of 0.5 mm. The resin of each bundle contains a colouring pigment different from those of the other bundles. The outer reinforcing members 46 each comprise a stranded body consisting of a steel wire core 47 around which are stranded six copper wires 48 and the middle reinforcing member 45 comprises a stranded body of seven steel wires. The optical cable has a width of 16 mm and a thickness of 4 mm.

In addition to providing protection for the optical guide or guides against damage that might otherwise be caused by a tensile force and by crushing, our improved optical cable has the additional important advantage that by virtue of its substantially flat form, the cable can be easily wound on a drum without effecting damage to the optical guide or guides.

What I claim as my invention is:

1. An optical cable comprising at least one optical bundle comprising at least one group of fibres of which at least some are optical fibres; at least two separate elongate reinforcing members arranged with their axes and the axis of at least one optical bundle lying substantially in a common plane and with the at least one optical bundle located between and spaced from two reinforcing members, each reinforcing member having an overall dimension perpendicular to said common plane that is substantially greater than the corresponding overall dimension of the at least one optical bundle so that the at least one optical bundle lies in the space bounded by two planes one located on each side of the two members and each touching both members; and an extruded outer protective sheath which surrounds and fills the interstices between the at least one bundle and the reinforcing members.

2. An optical cable as claimed in claim 1, wherein each elongate reinforcing member has an overall dimension perpendicular to the common plane containing the axes of the reinforcing members that is substantially greater than the corresponding overall dimension of the optical bundle or of the larger or largest of the optical bundles.

3. An optical cable as claimed in claim 1, wherein the said dimensions of the reinforcing members are substantially equal to one another.

4. An optical cable as claimed in claim 1, wherein each elongate reinforcing member comprises a plurality of elongate elements stranded together.

5. An optical cable as claimed in claim 4, wherein each stranded elongate reinforcing member is die-formed.

6. An optical cable as claimed in claim 4, wherein at least one of the elongate elements of each of at least two of the stranded reinforcing members is of a metallic material of high electrical conductivity.

7. An optical cable as claimed in claim 6, wherein each of some or all of the conductor elements of each reinforcing member is individually insulated.

8. An optical cable as claimed in claim 7, wherein each conductor element is of a colour distinguishable from that of the other conductor elements.

9. An optical cable as claimed in claim 1, wherein the optical cable includes at least two elongate reinforcing members each of which has an outer surface of a metallic material of high electrical conductivity.

10. An optical cable as claimed in claim 1, wherein the outer protective sheath is an extruded sheath of plastics material.

* * * * *